(12) United States Patent
Zhang et al.

(10) Patent No.: US 11,330,541 B2
(45) Date of Patent: May 10, 2022

(54) SYSTEM INFORMATION SENDING METHOD AND APPARATUS

(71) Applicant: Huawei Technologies Co., Ltd., Shenzhen (CN)

(72) Inventors: Xu Zhang, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/272,141

(22) Filed: Feb. 11, 2019

(65) Prior Publication Data

US 2019/0174438 A1 Jun. 6, 2019

Related U.S. Application Data

(63) Continuation of application No. PCT/CN2017/097171, filed on Aug. 11, 2017.

(30) Foreign Application Priority Data

Aug. 12, 2016 (CN) .......................... 201610670094.2

(51) Int. Cl.
*H04W 56/00* (2009.01)
*H04W 74/08* (2009.01)
(Continued)

(52) U.S. Cl.
CPC ..... *H04W 56/001* (2013.01); *H04W 72/0446* (2013.01); *H04W 72/0453* (2013.01);
(Continued)

(58) Field of Classification Search
CPC ........... H04W 56/001; H04W 74/0833; H04W 72/0473; H04W 72/0453; H04W 72/0446;
(Continued)

(56) References Cited

U.S. PATENT DOCUMENTS 10,123,356 B2 * 11/2018 Axmon ................. H04L 5/0016
10,187,878 B2 * 1/2019 Lin ........................ H04W 72/12
(Continued)

FOREIGN PATENT DOCUMENTS

CN 101646234 A 2/2010
CN 102026375 A 4/2011
(Continued)

OTHER PUBLICATIONS

"Final Report of 3GPP TSG RAN WG1 #84bis v1.0.0 (Busan, Korea, Apr. 11-15, 2016)," Source: MCC Support, Document for: Approval, 3GPP TSG RAN WG1 Meeting #85, R1-163961, Nanjing, China, May 23-27, 2016, 159 pages.
(Continued)

*Primary Examiner* — Jay P Patel

(74) *Attorney, Agent, or Firm* — Slater Matsil, LLP

(57) ABSTRACT

A system information sending method and an apparatus. The method includes receiving, by a base station, at least one first uplink trigger signal in a first time-frequency resource group in a first radio frame, determining, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located, and sending the first system information on the time-frequency resource of the first system information.

12 Claims, 6 Drawing Sheets

(51) Int. Cl.
*H04W 72/04* (2009.01)
*H04L 5/00* (2006.01)

(52) U.S. Cl.
CPC ... *H04W 72/0473* (2013.01); *H04W 74/0833* (2013.01); *H04L 5/0007* (2013.01)

(58) Field of Classification Search
CPC .......... H04W 5/0007; H04W 72/0493; H04W 72/042; H04W 72/044; H04W 56/00; H04W 48/08
See application file for complete search history.

(56) References Cited

U.S. PATENT DOCUMENTS

| | | | |
|---|---|---|---|
| 10,555,329 B2 * | 2/2020 | Golitschek | H04W 74/0808 |
| 10,588,064 B2 * | 3/2020 | Zhang | H04W 88/08 |
| 10,674,544 B2 | 6/2020 | Stern-Berkowitz et al. | |
| 10,708,853 B2 * | 7/2020 | Bendlin | H04W 48/10 |
| 2008/0225776 A1 * | 9/2008 | Alanara | H04L 1/08 370/315 |
| 2012/0250620 A1 | 10/2012 | Hu | |
| 2013/0182658 A1 * | 7/2013 | Xu | H04L 5/001 370/329 |
| 2014/0105152 A1 * | 4/2014 | Wu | H04L 5/001 370/329 |
| 2014/0286240 A1 * | 9/2014 | Kim | H04W 56/0005 370/328 |
| 2015/0009903 A1 | 1/2015 | Xue et al. | |
| 2015/0382284 A1 | 12/2015 | Brismar et al. | |
| 2016/0128006 A1 | 5/2016 | Ji et al. | |
| 2016/0143035 A1 * | 5/2016 | Xue | H04W 72/048 370/329 |
| 2016/0157172 A1 * | 6/2016 | Jeong | H04W 48/20 370/329 |
| 2016/0234830 A1 * | 8/2016 | Kim | H04L 5/0091 |
| 2016/0269163 A1 | 9/2016 | Wong et al. | |
| 2016/0277944 A1 * | 9/2016 | Bhushan | H04L 5/14 |
| 2017/0013638 A1 * | 1/2017 | Takahashi | H04W 72/1278 |
| 2017/0019921 A1 * | 1/2017 | Hsu | H04W 24/08 |
| 2017/0086168 A1 * | 3/2017 | Takahashi | H04W 28/0278 |
| 2017/0111932 A1 * | 4/2017 | Uemura | H04W 74/0833 |
| 2017/0310436 A1 * | 10/2017 | Nuzman | H04W 72/0406 |
| 2017/0311344 A1 * | 10/2017 | Lee | H04L 5/0007 |
| 2017/0332410 A1 * | 11/2017 | Babaei | H04W 74/0833 |
| 2018/0249387 A1 * | 8/2018 | Zhang | H04W 48/08 |
| 2018/0288683 A1 * | 10/2018 | Bendlin | H04W 48/14 |
| 2019/0150069 A1 | 5/2019 | Mustapha | |
| 2019/0174554 A1 * | 6/2019 | Deenoo | H04W 80/02 |
| 2019/0246319 A1 * | 8/2019 | Lee | H04W 72/042 |

FOREIGN PATENT DOCUMENTS

| | | |
|---|---|---|
| CN | 102378129 A | 3/2012 |
| EP | 2824975 B1 | 3/2016 |
| EP | 3419340 A1 | 12/2018 |
| JP | 2010506434 A | 2/2010 |
| JP | 2015502062 A | 1/2015 |
| JP | 2015041818 A | 3/2015 |
| JP | 2017530605 A | 10/2017 |
| JP | 2017536755 A | 12/2017 |
| KR | 20130100360 A | 9/2013 |
| KR | 20160078466 A | 7/2016 |
| WO | 2013068369 A1 | 5/2013 |
| WO | 2015063593 A2 | 5/2015 |
| WO | 2016045715 A1 | 3/2016 |
| WO | 2016073243 A1 | 5/2016 |
| WO | 2016025899 A8 | 5/2017 |
| WO | WO-2017071473 A1 * | 5/2017 ........ H04W 74/0833 |

OTHER PUBLICATIONS

"Preliminary View on Initial Access in 5G," Agenda Item: 9.2, Source: Samsung, Document for: Discussion and Decision, 3GPP TSG-RAN WG2 Meeting #93bis, R2-162300, 3GPP TSG-RAN WG2 Meeting #93bis, Dubrovnik, Croatia, Apr. 11-15, 2016, 3 pages.

"System Information Signalling Design in NR," Agenda Item: 9.4.3.2.3, Source: Samsung, Document for: Discussion & Decision, 3GPP TSG-RAN WG2 Meeting #94, R2-163371, Nanjing, China, May 23-27, 2016, 7 pages.

Vodafone et al.,"NarrowBand IOT," 3GPP TSG RAN meeting #70, RP-151931, Status Report to TSG, Sitges, Spain, Dec. 7-10, 2015, 26 pages.

* cited by examiner

SYSTEM INFORMATION SENDING METHOD AND APPARATUS

CROSS-REFERENCE TO RELATED APPLICATIONS

This application is a continuation of International Application No. PCT/CN2017/097171, filed on Aug. 11, 2017, which claims priority to Chinese Patent Application No. 201610670094.2, filed on Aug. 12, 2016. The disclosures of the aforementioned applications are hereby incorporated by reference in their entireties.

TECHNICAL FIELD

The present invention relates to the field of communications technologies, and in particular, to a system information sending method and an apparatus.

BACKGROUND

With continuous evolution of a Long Term Evolution (LTE) system, a more flexible network access technology is required for a future next-generation mobile communications network. In an LTE wireless network system, transmission in which a base station sends information to user equipment (UE) is defined as downlink transmission, and correspondingly, transmission in which user equipment sends information to a base station is uplink transmission.

In a current LTE system, in a downlink transmission process, a base station needs to simultaneously send a synchronization signal and a broadcast channel on time-frequency resources predefined for user equipment. The broadcast channel carries system information, the system information occupies a relatively large time-frequency resource, and the synchronization signal occupies a relatively small time-frequency resource. Because the base station periodically sends the synchronization signal and the broadcast channel simultaneously to the user equipment based on a preset frequency, all time-frequency resources of an entire subframe of a transmission channel are occupied. Consequently, the predefined time-frequency resources cannot be flexibly changed into available resources for uplink transmission, and resource configuration flexibility in the LTE system is limited.

For example, as shown in FIG. 1, a time division duplex (TDD) system includes 10 subframes numbered from 0 to 9, and each subframe corresponds to one time-frequency resource used for uplink or downlink transmission. Because a fixed time-frequency resource in subframes 0 to 9 is required to carry a downlink synchronization signal and a downlink broadcast channel, subframe 0 and subframe 5 are predefined as subframes used for downlink transmission, and it is specified that time-frequency resources of the two subframes are time-frequency resources used for downlink transmission. Therefore, when the two time-frequency resources carry the synchronization signal and the broadcast channel that are sent by the base station, because the entire time-frequency resources are occupied by system information, subframe 0 and subframe 5 are used for only downlink transmission, and cannot be used for sending uplink data. Consequently, resource configuration for subframe 0 and subframe 5 is affected.

SUMMARY

This application provides a system information sending method and an apparatus, to resolve a problem that a time-frequency resource cannot be flexibly configured because a predefined subframe is used for a downlink bearer. To resolve the technical problem, this application discloses the following technical solutions.

According to a first aspect, an embodiment of this application provides a system information sending method. The method includes receiving, by a base station, at least one first uplink trigger signal in a first time-frequency resource group in a first radio frame, determining, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located, and sending the first system information on the time-frequency resource of the first system information.

In the method provided in this aspect, the base station delivers the first system information to a user equipment based on the determined time-frequency resource only after the base station receives an uplink trigger signal sent by the user equipment. Because the time-frequency resource used for delivering the first system information has a time offset relative to the frame header location of the radio frame, it can be ensured that the base station does not simultaneously send a synchronization signal and a broadcast channel that carries the first system information, so that the base station does not send the first system information without detecting the uplink trigger signal. In this case, because a time-frequency resource used for receiving a downlink bearer is used to receive only a periodically sent synchronization signal, and the synchronization signal occupies a relatively small quantity of resources, most of remaining time-frequency resources can be dynamically configured, for example, used for uplink data transmission, so that occupation of time-frequency resources of an entire subframe is avoided, thereby improving resource configuration flexibility in an LTE system.

With reference to the first aspect, in a first implementation of the first aspect, the method further includes receiving, by the base station, at least one second uplink trigger signal in a second time-frequency resource group in a second radio frame, determining, based on a time-frequency resource of the at least one second uplink trigger signal, a time-frequency resource used for sending second system information, where a start location of the time-frequency resource of the second system information in time domain has a second time offset relative to a frame header location of a radio frame in which the second system information is located, and the first time offset is different from the second time offset, and sending the second system information on the time-frequency resource of the second system information. In this aspect, when the base station receives two or more uplink trigger signals in a time-frequency resource group of a radio frame, different time offsets are determined, so that the base station sends system information on different time-frequency resources of the system information, to avoid occupation of a fixed time-frequency resource, and improve flexibility of time-frequency resource configuration on a base station side. Therefore, the base station can flexibly schedule a data service.

With reference to the first aspect, in a second implementation of the first aspect, before the receiving, by a base station, at least one first uplink trigger signal in a first time-frequency resource group, the method further includes sending, by the base station, first indication information used to receive an uplink trigger signal, where the first indication information is located in the first time-frequency resource group of the radio frame, so that the uplink trigger signal sent by the user equipment can be received, and then the system information is generated and sent to the user equipment.

With reference to the first aspect or the first or the second implementation of the first aspect, in a third implementation of the first aspect, the determining, based on a time-frequency resource of the at least one first uplink trigger signal, a time-frequency resource used for sending first system information includes determining, based on the time-frequency resource of the at least one first uplink trigger signal, a candidate time-frequency resource group used for sending the first system information, and determining, based on the candidate time-frequency resource group of the first system information, the time-frequency resource used for sending the first system information.

According to a second aspect, an embodiment of this application provides a system information receiving method. The method includes receiving, by user equipment, a synchronization signal of a serving cell or second indication information, where the second indication information is used to indicate trigger signal sequence information, determining a trigger signal resource of the serving cell based on the synchronization signal or the second indication information, where the trigger signal resource of the serving cell includes a time-frequency resource of at least one uplink trigger signal and/or sequence information of the at least one uplink trigger signal, generating an uplink trigger signal based on the trigger signal resource of the serving cell, and sending the uplink trigger signal on a time-frequency resource of the uplink trigger signal, determining, based on the time-frequency resource of the uplink trigger signal, a second time-frequency resource group used for sending system information, and receiving the system information in the second time-frequency resource group of the system information.

In the method provided in this aspect, before receiving the system information sent by a base station, the user equipment generates the uplink trigger signal based on the trigger signal resource of the serving cell, and sends the uplink trigger signal to the base station. This avoids the following problem because the user equipment sends the trigger signal after receiving the system information, the base station simultaneously sends a synchronization signal and a broadcast channel that carries the system information, and consequently time-frequency resources of an entire subframe are occupied, and flexible time-frequency resource configuration is affected.

With reference to the second aspect, in a first implementation of the second aspect, the determining a trigger signal resource of the serving cell based on the synchronization signal includes determining, based on the synchronization signal, identification information of the serving cell or identification information corresponding to the serving cell, where the identification information corresponding to the serving cell is identification information that has a same function as the identification information of the serving cell and that can be used to identify the serving cell, and determining the trigger signal resource of the serving cell based on the identification information of the serving cell or the identification information corresponding to the serving cell.

With reference to the second aspect, in a second implementation of the second aspect, the generating an uplink trigger signal based on the trigger signal resource of the serving cell includes determining the trigger signal sequence information based on the trigger signal resource of the serving cell, and generating the uplink trigger signal based on the trigger signal sequence information.

With reference to the second aspect, in a third implementation of the second aspect, if the user equipment receives the second indication information, the generating an uplink trigger signal based on the trigger signal resource of the serving cell includes obtaining, by the user equipment, the trigger signal sequence information based on the second indication information, and generating the uplink trigger signal based on the trigger signal sequence information.

With reference to any one of the second aspect and the first to the third implementations of the second aspect, in a fourth implementation of the second aspect, the sending the uplink trigger signal on a time-frequency resource of the uplink trigger signal includes before sending the uplink trigger signal, detecting whether first indication information is received, and if the first indication information is received, determining, based on the first indication information, the time-frequency resource used for sending the uplink trigger signal, and sending the uplink trigger signal on the time-frequency resource of the uplink trigger signal, so that the base station can receive the sent uplink trigger signal.

With reference to any one of the second aspect and the first to the fourth implementations of the second aspect, in a fifth implementation of the second aspect, the receiving the system information in the second time-frequency resource group includes determining whether the system information is received in the second time-frequency resource group, and if the user equipment does not receive the system information in the second time-frequency resource group, changing a format of the uplink trigger signal and/or increasing transmit power, and sending the uplink trigger signal again based on the changed format and/or the increased transmit power, to ensure that base station can receive the uplink trigger signal sent by the user equipment.

With reference to any one of the second aspect and the first to the fifth implementations of the second aspect, in a sixth implementation of the second aspect, the second time-frequency resource group includes at least one system information resource of the serving cell, and the system information resource includes a time-domain resource, a frequency-domain resource, and a codeword resource.

With reference to the sixth implementation of the second aspect, in a seventh implementation of the second aspect, the frequency-domain resource of the system information and a frequency-domain resource of the uplink trigger signal occupy a same frequency-domain subcarrier, the time-domain resource of the system information is a time-domain resource within a specified time interval after the user equipment sends the uplink trigger signal, and the codeword resource of the system information includes a scrambling code of the system information.

According to a third aspect, an embodiment of this application further provides a base station, including a transceiver unit and a processing unit, where the transceiver unit is configured to receive at least one first uplink trigger signal in a first time-frequency resource group in a first radio frame, the processing unit is configured to determine, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located, and the transceiver unit is further configured to send the first system information on the time-frequency resource of the first system information.

With reference to the third aspect, in a first implementation of the third aspect, the transceiver unit is further configured to receive at least one second uplink trigger signal in a second time-frequency resource group in a second radio frame, the processing unit is configured to determine, based on a time-frequency resource of the at least one second uplink trigger signal, a time-frequency resource used for sending second system information, where a start location of the time-frequency resource of the second system information in time domain has a second time offset relative to a frame header location of a radio frame in which the second system information is located, and the first time offset is different from the second time offset, and the transceiver unit is further configured to send the second system information on the time-frequency resource of the second system information.

With reference to the third aspect, in a second implementation of the third aspect, the transceiver unit is further configured to send first indication information used to receive an uplink trigger signal, where the first indication information is located in the first time-frequency resource group of the radio frame.

With reference to either of the third aspect and the first or the second implementation of the third aspect, in a third implementation of the third aspect, the processing unit is further configured to determine, based on the time-frequency resource of the at least one first uplink trigger signal, subcarriers that occupy a same frequency region, and determine the time-frequency resource of the first system information based on the subcarriers that occupy the same frequency region.

According to a fourth aspect, an embodiment of this application further provides user equipment, including a transceiver unit and a processing unit.

The transceiver unit is configured to receive a synchronization signal of a serving cell or second indication information, where the second indication information is used to indicate trigger signal sequence information, the processing unit is configured to determine a trigger signal resource of the serving cell based on the synchronization signal and/or the second indication information, where the trigger signal resource of the serving cell includes a time-frequency resource of at least one uplink trigger signal and/or sequence information of the at least one uplink trigger signal, and generate an uplink trigger signal based on the trigger signal resource of the serving cell, the transceiver unit is further configured to send the uplink trigger signal on a time-frequency resource of the uplink trigger signal, the processing unit is further configured to determine a second time-frequency resource group in a radio frame based on the time-frequency resource of the uplink trigger signal, and the transceiver unit is further configured to receive system information in the second time-frequency resource group.

In addition, the user equipment further includes units configured to implement all or some of the method steps in the first to the seventh implementations of the second aspect.

According to a fifth aspect, an embodiment of this application further provides an information sending system, where the system includes a base station and at least one user equipment, the base station includes a transceiver and a processor, and the user equipment includes a transceiver and a processor.

The user equipment receives a synchronization signal of a serving cell or second indication information, where the second indication information is used to indicate trigger signal sequence information, determines a trigger signal resource of the serving cell based on the synchronization signal or the second indication information, where the trigger signal resource of the serving cell includes a group of uplink trigger signal time-frequency resources and/or a group of uplink trigger signal codewords.

The user equipment further generates an uplink trigger signal based on the trigger signal resource of the serving cell, and sends the uplink trigger signal on a time-frequency resource of the uplink trigger signal.

The base station receives at least one first uplink trigger signal in a first time-frequency resource group in a first radio frame, determines, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located, and sends the first system information on the time-frequency resource of the first system information.

The user equipment determines, based on the time-frequency resource of the uplink trigger signal, a second time-frequency resource group used for sending the system information, and receives the first system information in the second time-frequency resource group of the system information.

The base station is further configured to implement an implementation of any technical solution from the first aspect to the third implementation of the first aspect, and the user equipment is further configured to implement an implementation of any technical solution from the second aspect to the seventh implementation of the second aspect.

In the system provided in this aspect, the base station periodically sends only the synchronization signal in an idle mode, and does not deliver the system information before the uplink trigger signal is detected by the base station. In this case, because the synchronization signal occupies a relatively small quantity of adaptive resources, all remaining time-frequency resources of the subframe can be dynamically configured, to flexibly adapt to an uplink service and a downlink service in the serving cell. This avoids the following problem because the base station simultaneously sends the synchronization signal and a broadcast channel that carries the system information, an entire time-frequency resource is occupied, and consequently resource configuration flexibility in an LTE system is affected.

According to a sixth aspect, this application further provides a computer storage medium, where the computer storage medium may store a program, and when the program is executed, some or all of the steps in the implementations of the system information sending method and the apparatus that are provided in the present invention may be performed.

BRIEF DESCRIPTION OF THE DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DETAILED DESCRIPTION OF ILLUSTRATIVE EMBODIMENTS

A system information sending method and an apparatus provided in embodiments of this application are mainly applied to a 5G communications system, an LTE system, or an evolved LTE system, or may be applied to a single-carrier system or a multi-carrier system. This method is used by a base station (eNB for short) to send system information to user equipment (UE for short). The system information includes system bandwidth information, a system frame number, system information related to access of the user equipment, and the like.

The user equipment in this application may be a user equipment, a user terminal, a client, or the like. Specifically, the user equipment further includes a mobile phone, a tablet computer, a palmtop computer, a mobile Internet device, or the like.

A serving cell used in the embodiments of this application may be a serving cell configured by a network side device for user equipment, or may be a serving cell that serves user equipment, or may be a serving cell accessed by user equipment. The serving cell in the embodiments of the present invention may also be referred to as a component carrier. The serving cell in the embodiments of the present invention may be a primary serving cell of the user equipment, or may be a secondary serving cell of the user equipment.

In the LTE system, uplink or downlink data transmission is performed between a base station and user equipment by using a radio frame. The radio frame is a time unit in the LTE system. In the LTE system, it is specified that each radio frame includes 10 subframes and has a time length of 10 ms. A radio frame structure depends on combinations of different types of subframes. In a TDD system, there are seven determined types of radio frame structures. A length of each subframe is 1 ms, and each subframe includes a plurality of types. In a TDD mode, a subframe includes a downlink subframe, an uplink subframe, and a special subframe, in a frequency division duplex (FDD) mode, a subframe includes a downlink subframe and an uplink subframe.

Figure 2:
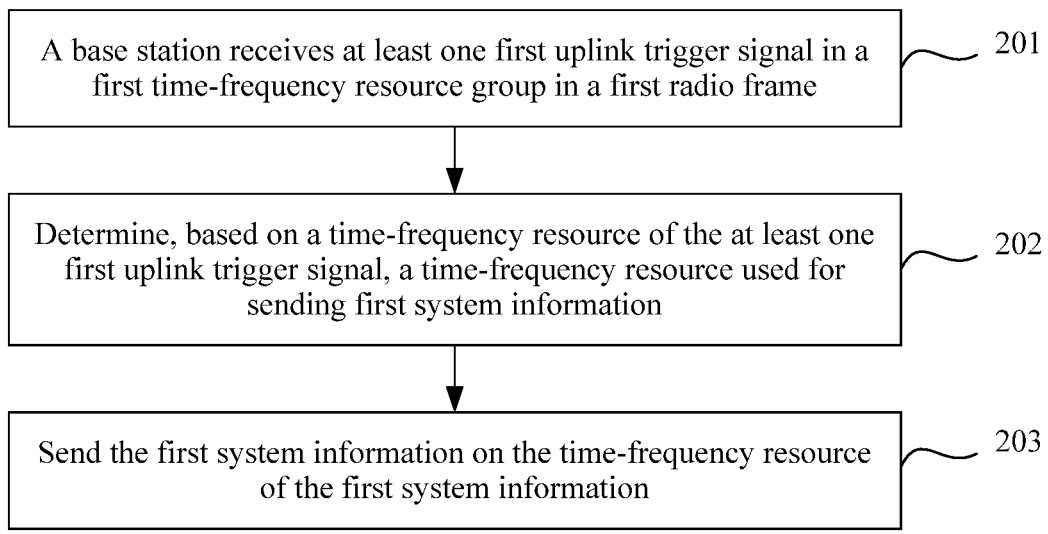
FIG. 2 is a schematic flowchart of a system information sending method according to an embodiment of this application.

In this application, to improve resource configuration flexibility in a next-generation communications system, system design aims to reduce predefined time-frequency resources as far as possible, and minimize continuously transmitted signals, so that time-frequency resources that can be flexibly configured are maximized. An embodiment of this application provides a system information sending method. As shown in FIG. 2, the method includes the following steps.

Step 201: A base station receives at least one first uplink trigger signal in a first time-frequency resource group in a first radio frame. A form of the trigger signal is similar to a form of a PRACH signal in LTE.

A time-frequency resource is a resource used to transmit a physical channel and a physical signal in time domain and frequency domain in an LTE system. Specifically, in the LTE system, it is specified that a minimum time unit for transmitting a physical channel and/or a physical signal in time domain is an orthogonal frequency division multiplexing (OFDM) symbol, and a minimum unit in frequency domain is a subcarrier. A resource that includes one minimum resource unit in time domain and one minimum resource unit in frequency domain is referred to as a resource element (RE). The time-frequency resource includes a group of REs in frequency domain and time domain. For example, the time-frequency resource includes one subframe in time domain, and includes 72 subcarriers in frequency domain, where each subframe includes 14 OFDM symbols.

Figure 1:
FIG. 1 is a schematic diagram of a radio frame in a TDD system.

The first time-frequency resource includes at least one subframe. For example, a radio frame in FIG. 1 includes 10 subframes subframes 0 to 9, and DL 0 and DL 5 are predefined as subframes used to implement downlink transmission. In step 201, the first time-frequency resource group is a time-frequency resource group including subframe 1 to subframe 4, and/or a time-frequency resource group including subframe 6 to subframe 9, and the uplink trigger signal can be received on a time-frequency resource of each subframe in both the two time-frequency resource groups. In the first time-frequency resource group, at least one uplink trigger signal may be received, and in each subframe in the first time-frequency resource group, at least one uplink trigger signal may be received.

In addition, before the uplink trigger signal is received, the base station periodically sends a synchronization signal based on preset frequency, where the synchronization signal carries identification (ID) information or identification information of a serving cell by using a synchronization signal sequence.

Step 202: The base station determines, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located.

The determining, based on a time-frequency resource of the first uplink trigger signal, a time-frequency resource used for sending first system information includes determining, based on the time-frequency resource of the at least one first uplink trigger signal, a candidate time-frequency resource group used for sending the first system information, and determining, from the candidate time-frequency resource group of the first system information, the time-frequency resource of the first system information.

Figure 3:
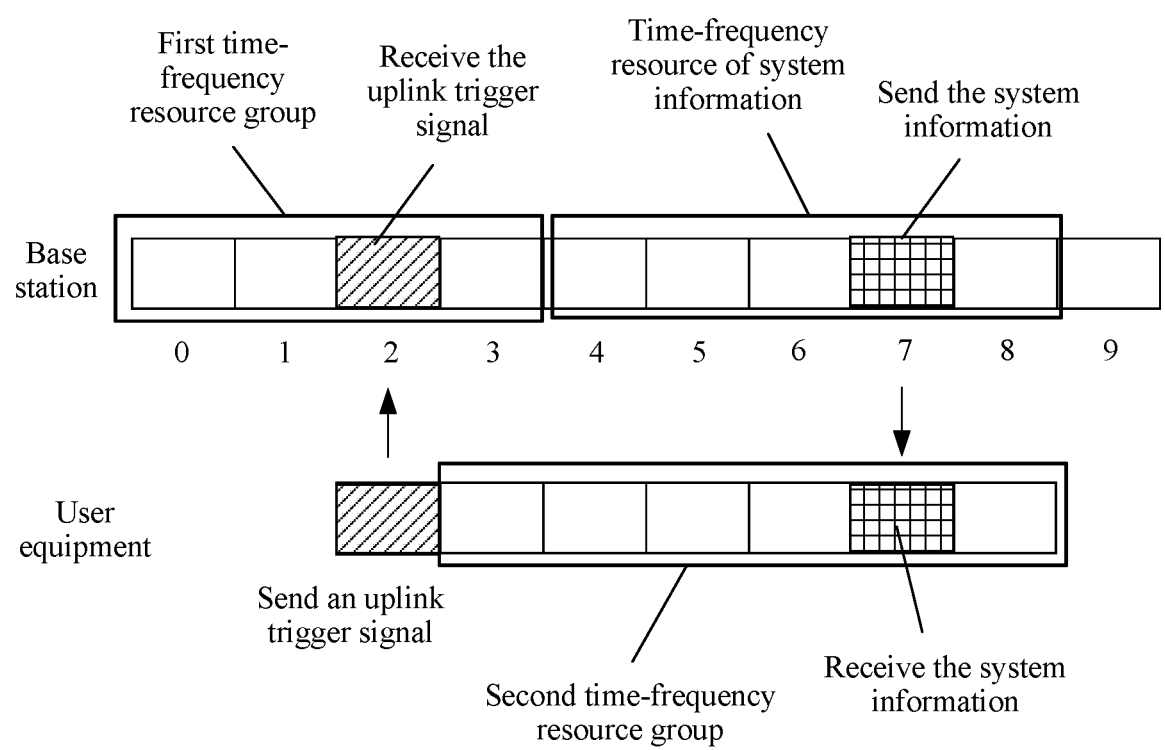
FIG. 3 is a schematic diagram of triggering system information by user equipment according to an embodiment of this application.

As shown in FIG. 3, the base station receives, on a time-frequency resource of subframe 2, an uplink trigger signal sent by user equipment, and determines, based on a time-frequency resource of the trigger signal on a user equipment side, a time-frequency resource group including subframe 4 to subframe 8, that is, the candidate time-frequency resource group of the first system information, to send the system information. A radio frame on a base station side includes 10 subframes subframes 0 to 9. The base station determines, based on a quantity of resource locations on which the trigger signal is received in the first time-frequency resource group and/or based on a subframe type of a time-frequency resource group used for sending the trigger signal, a time-frequency resource used for sending the system information in the time-frequency resource group.

Specifically, a process in which the base station determines, based on the trigger signal received in the first time-frequency resource group, the time-frequency resource group used for sending the system information is as follows. As shown in FIG. 3, the first time-frequency resource group includes subframes 0 to 3, and the base station receives the at least one uplink trigger signal in the first time-frequency resource group, and if a start location of a time-frequency resource corresponding to the at least one uplink trigger signal in time domain is in subframe 2, the base station determines that the time-frequency resource group used for sending the system information is the time-frequency resource group including subframes 4 to 8. In other words, a time offset between the subframe of the start location and a last subframe in the time-frequency resource group determined by the base station for sending the system information is a fixed time offset. In this embodiment, the time offset is six subframes.

A resource of the system information in this application includes a time resource, a frequency resource, a codeword resource, and the like. The codeword resource includes a system information scrambling code determined based on the time-frequency resource of the uplink trigger signal. A relationship between the time-frequency resource of the uplink trigger signal and the time-frequency resource of the system information is a frequency-domain resource of the system information and a frequency-domain resource of the uplink trigger signal occupy a same frequency-domain subcarrier, and a time-domain resource of the system information has a time offset relative to a time-domain resource used by the user equipment to send the uplink trigger signal. The time offset is at least one subframe and/or one OFDM symbol.

In addition, the base station may further indicate, to the user equipment, the time-frequency resource used for sending the trigger signal. For example, the base station sends downlink common control instruction information or downlink control instruction information for specific user equipment, to indicate the time-frequency resource used for sending the trigger signal.

Step 203: The base station sends the first system information on the time-frequency resource of the first system information. Further, the base station may send the first system information by delivering a broadcast channel that carries the first system information.

Further, if the base station sends system information on at least two time-frequency resource locations, and the at least two time-frequency resources locations are respectively within at least two different radio frames, it is determined that each time-frequency resource used for sending corresponding system information has a different time offset relative to a start location of a frame header of a radio frame in which the time-frequency resource is located. To be specific, the time-frequency resource used for sending the first system information has a first time offset relative to a frame header location of the first radio frame, a time-frequency resource used for sending second system information has a second time offset relative to a frame header location of a second radio frame, and so on. This ensures that a time-frequency resource of each piece of sent system information is different from a start location of a frame header of a radio frame in which the system information is located, thereby avoiding occupation of a preset fixed downlink time-frequency resource.

In this embodiment of this application, the base station does not need to occupy a fixed time-frequency resource to send the system information. Therefore, a subframe type of a subframe that is originally used for sending the system information may also be changed. For example, the subframe is changed into an uplink transmission subframe. In this way, system resource flexibility is improved.

Further, that a base station receives at least one uplink trigger signal in step 201 includes receiving, by the base station, two or more uplink trigger signals on different time-frequency resource locations in a time-frequency resource group in a same radio frame, or separately receiving, by the base station, two or more uplink trigger signals on different time-frequency resources in different radio frames including contiguous radio frames or noncontiguous radio frames.

If the base station receives at least one second uplink trigger signal in a second time-frequency resource group in the second radio frame, a step of determining the time-frequency resource used for sending the second system information includes determining, based on a time-frequency resource of the at least one second uplink trigger signal, the time-frequency resource used for sending the second system information. A start location of the time-frequency resource of the second system information in time domain has a second time offset relative to a frame header location of a radio frame in which the second system information is located, and the first time offset is different from the second time offset. The time offset is at least one subframe and/or one OFDM symbol. After the time-frequency resource of the second system information is determined, the second system information is sent on the time-frequency resource of the second system information. Therefore, different base stations send system information on different time-frequency resources of the system information, to avoid occupation of a fixed time-frequency resource, and improve flexibility of time-frequency resource configuration on the base station side. Therefore, the base station can flexibly schedule an uplink or downlink data service.

Further, that a base station receives at least one first uplink trigger signal in a first time-frequency resource group in a first radio frame in step 201 includes sending, by the base station, first indication information on a start location of a subframe in which a time-frequency resource location of the uplink trigger signal is located, where the first indication information is used to indicate whether the uplink trigger signal can be received in a current subframe, and the indication information further includes a uniform indication in the entire radio frame, to indicate whether the user equipment can send the uplink trigger signal.

If the first indication information indicates that the uplink trigger signal can be received in the current subframe, the base station receives the uplink trigger signal on at least one time-frequency resource location in the first time-frequency resource group of the radio frame. If the base station receives two or more uplink trigger signals, the base station sends, based on a predefined time length and each uplink trigger signal, the system information to user equipment corresponding to each received uplink trigger signal. Alternatively, the time-frequency resource of the system information is determined based on time-frequency resource locations on which a plurality of trigger signals are received. For example, if the uplink trigger signal is received in subframe n, the system information is sent on a frequency-domain location that is same as that of the uplink trigger signal and that is in a subframe earlier than subframe n+k.

Figure 4:
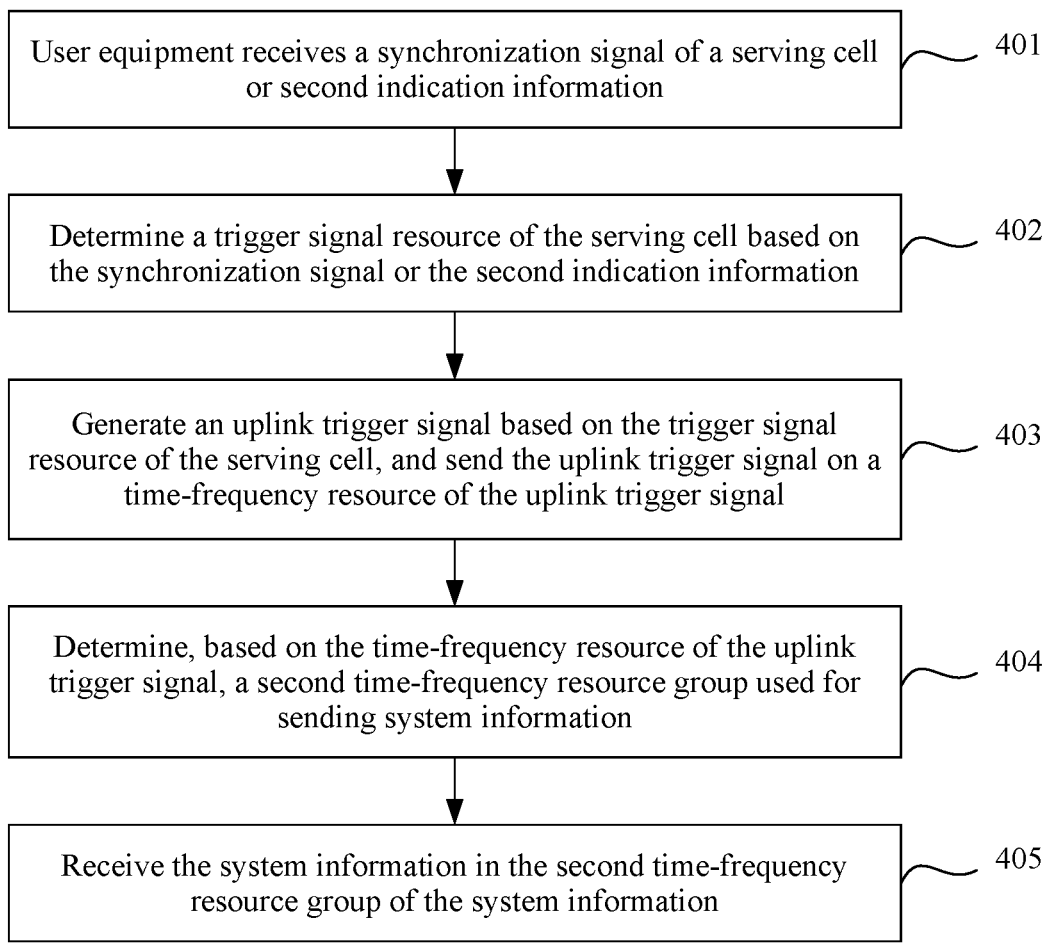
FIG. 4 is a schematic flowchart of a system information receiving method according to an embodiment of this application.

In step 201, before the base station receives the uplink trigger signal, the method further includes generating and sending, by the user equipment, the uplink trigger signal. As shown in FIG. 4, a specific process is as follows.

Step 401: User equipment receives a synchronization signal of a serving cell or second indication information, where the second indication information is used to indicate trigger signal sequence information.

Step 402: The user equipment determines a trigger signal resource of the serving cell based on the synchronization signal or the second indication information, where the trigger signal resource of the serving cell includes a time-frequency resource of at least one uplink trigger signal and/or sequence information of the at least one uplink trigger signal.

In step 402, if indication information received by the user equipment is the synchronization signal of the serving cell, the user equipment determines the trigger signal resource of the serving cell based on the synchronization signal. Specifically, first, the user equipment determines, based on the synchronization signal, ID information of the serving cell or ID information corresponding to the serving cell, and then the user equipment determines the trigger signal resource of the serving cell based on the ID information of the serving cell or the ID information corresponding to the serving cell.

The ID information of the serving cell may be a cell-ID, or may be other identification information, where the cell-ID is a unique identifier of the serving cell in a network. The ID information corresponding to the serving cell is ID information that has a same function as the cell-ID and that can be used to identify the serving cell, for example, a hyper-cell ID that can uniquely identify a group of serving cells.

The uplink trigger signal resource includes a codeword information group used for generating a trigger signal, information about a time-frequency resource used for sending the trigger signal, initial format information of the trigger signal, initial power information of the trigger signal, and the like. For example, a time-domain resource of the trigger signal is all or some subframes in a radio frame, and a frequency-domain resource is the same as or differs by one frequency-domain offset from a frequency-domain resource used for receiving the synchronization signal, the initial format information of the trigger signal includes a quantity of occupied contiguous OFDM symbols or a maximum quantity of repeatedly sent trigger signals, a time length for sending the trigger signal, and a quantity of retransmissions of the trigger signal, and the initial power information of the trigger signal includes a value of power at which the trigger signal is transmitted for the first time and a value of a power increment during retransmission. Format information of the trigger signal includes the time length for sending the trigger signal and the quantity of retransmissions of the trigger signal.

In step 402, the indication information received by the user equipment may alternatively be indication information or trigger sequence information sent by a base station. The trigger sequence information includes codeword information or the codeword information group used for generating the trigger signal, a time-frequency resource location for sending the trigger signal, the initial format information of the trigger signal, and the initial power information of the trigger signal.

Step 403: The user equipment generates an uplink trigger signal based on the trigger signal resource of the serving cell, and sends the uplink trigger signal on a time-frequency resource of the uplink trigger signal.

That the user equipment generates a trigger signal based on the trigger signal resource in step 403 specifically includes if the user equipment receives the synchronization signal of the serving cell, determining a sequence information group of the trigger signal based on the trigger signal resource, and randomly selecting a sequence from the sequence information group as a trigger signal sequence, to generate the trigger signal.

If the second indication information received by the user equipment includes the trigger signal sequence information, that the user equipment generates an uplink trigger signal based on the trigger signal resource of the serving cell includes obtaining, by the user equipment, a trigger signal sequence based on the second indication information, and generating, by the user equipment, the uplink trigger signal based on the trigger signal sequence. The trigger signal sequence information includes a sequence used for generating the trigger signal, and further includes information such as a basic parameter or an instruction of the sequence used for generating the trigger signal.

Further, before the user equipment sends the generated trigger signal to the base station in step 403, the user equipment further needs to determine whether to send the uplink trigger signal. A specific process is as follows.

The user equipment detects, on a start location of a subframe in which the determined time-frequency resource of the uplink trigger signal is located, whether there is first indication information. If a sending instruction for sending the trigger signal is detected, the user equipment sends the uplink trigger signal on a determined time-frequency resource location of the trigger signal. If no first indication information for sending the trigger signal is detected, the user equipment does not send the trigger signal. The first indication information may include downlink control indication information and indication information that is used to indicate a current subframe type. Before sending the uplink trigger signal, the user equipment determines whether the base station can receive the uplink trigger signal and send system information. This avoids that the user equipment sends an invalid uplink trigger signal, thereby improving security and accuracy of system information transmission.

After the user equipment sends the generated uplink trigger signal to the base station, the base station performs step 201 to step 203 based on the uplink trigger signal, to send the system information to the user equipment by using a broadcast channel. After step 403, the method further includes.

Step 404: The user equipment determines a second time-frequency resource group in a radio frame based on the time-frequency resource of the uplink trigger signal. In other words, the user equipment determines one system information resource of the serving cell or a group of system information resources of the serving cell based on the sent uplink trigger signal.

In a process in which the user equipment determines the second time-frequency resource group, the user equipment determines, based on a location of the subframe in which the time-frequency resource of the uplink trigger signal is located, a time-frequency resource location for detecting system information of the serving cell, that is, a second time-frequency resource location. For example, as shown in FIG. 3, the user equipment determines, based on the location of the subframe in which the time-frequency resource of the sent uplink trigger signal is located, the time-frequency resource location for detecting the system information of the serving cell. For example, after sending the trigger signal in subframe n, the user equipment detects, in a time interval of k subframes from subframe n+1 to subframe n+k, whether a system information is received from the base station.

In FIG. 3, on the base station side, the time-frequency resource location for sending the system information is determined based on a time-frequency resource location of the synchronization signal received by the user equipment. For example, the synchronization signal of the serving cell is detected by the user equipment on a predetermined frequency-domain location of an $m^{th}$ OFDM symbol in subframe n, and the user equipment detects the system information of the serving cell on an $(m+v)^{th}$ OFDM symbol in subframe n+1. The system information may occupy one or more OFDM symbols. For example, the user equipment starts to receive the system information from the $(m+v)^{th}$ OFDM symbol.

If no system information is detected by the user equipment on the time-frequency resource location, the user equipment repeatedly performs step 403, to continue to send the uplink trigger signal on a subsequent time-frequency resource of the trigger signal, or the user equipment starts a timer, and repeats step 403 after the timer expires.

Step 405: The user equipment receives system information in the second time-frequency resource group.

The foregoing process in which the user equipment sends the trigger signal again further includes changing, by the user equipment, an initial format and/or transmit power of the trigger signal, using the updated trigger signal format and/or transmit power when sending the trigger signal next time, and specifically, using a larger quantity of retransmissions and greater transmit power, and if a quantity of retransmissions of the trigger signal and the transmit power of the trigger signal reach predefined maximum values, the format and the transmit power of the trigger signal are no longer changed.

When receiving no system information sent by the base station, the user equipment changes the initial format or increases the transmit power, to enable the sent uplink trigger signal to reach the base station, so that the base station can receive the uplink trigger signal and send the system information.

In the embodiment of this method, after receiving the trigger signal sent by the user equipment, the base station delivers the system information to the user equipment based on the determined time-frequency resource. Because the time-frequency resource used for delivering the system information has a time offset, it is ensured that the synchronization signal and a broadcast channel carrying the system information that are sent by the base station are not simultaneously sent, in other words, the base station does not send the system information when detecting no uplink trigger signal. In this case, because a time-frequency resource used for receiving a downlink bearer is used to receive only the synchronization signal, and a small quantity of resources are occupied, most of remaining time-frequency resources can be dynamically configured, for example, used for uplink data transmission, so that occupation of time-frequency resources of an entire subframe is avoided, thereby improving resource configuration flexibility in an LTE system.

Figure 5:
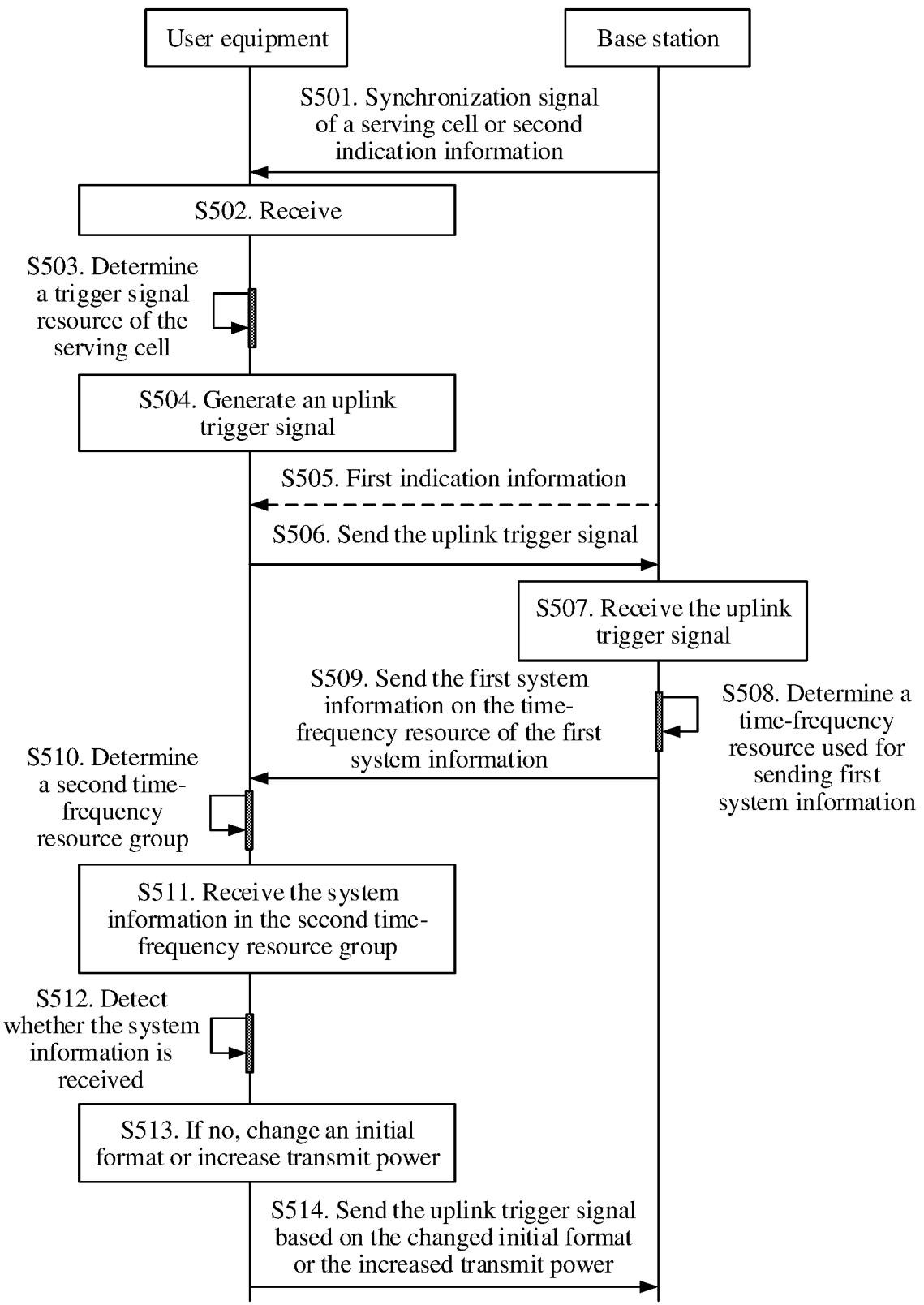
FIG. 5 is a schematic flowchart of sending system information between user equipment and a base station according to an embodiment of this application.

In another embodiment of this application, an information sending system is provided. The system includes a base station and at least one user equipment. FIG. 5 is a signaling diagram of sending system information to user equipment by a base station. Specifically, a process of generating and sending the system information in the system is as follows.

S501. The base station sends a synchronization signal of a serving cell or a second indication information to the user equipment.

S502. The user equipment receives the synchronization signal of the serving cell or the second indication information.

S503. The user equipment determines a trigger signal resource of the serving cell based on the received synchronization signal or the received second indication information. Specifically, the user equipment determines ID_I information or identification information based on a group of synchronization signals of the serving cell, and determines the trigger signal resource of the serving cell based on the ID_I information or the identification information, where the trigger signal resource of the serving cell includes a group of uplink trigger signal time-frequency resources and/or a group of uplink trigger signal codewords.

S504. The user equipment generates an uplink trigger signal based on the trigger signal resource of the serving cell, and determines whether the uplink trigger signal can be sent.

S505. If the user equipment detects or receives first indication information from the base station, where the first indication information is used to instruct the user equipment to send the trigger signal, the user equipment performs step S506.

S506. The user equipment sends the generated uplink trigger signal to the base station.

S507. The base station receives at least one uplink trigger signal on at least one time-frequency resource location in a first time-frequency resource group of a radio frame.

S508. The base station determines, based on a time-frequency resource location of the at least one uplink trigger signal, a first time-frequency resource location for sending first system information, where a start location of the first time-frequency resource location in time domain has a first time offset relative to a frame header location of a radio frame in which the first system information is located.

S509. The base station sends the first system information on the time-frequency resource location of the first system information.

S510. The user equipment determines a second time-frequency resource group based on a time-frequency resource of the uplink trigger signal.

S511. The user equipment receives the first system information in the second time-frequency resource group.

S512. The user equipment detects whether the first system information sent by the base station is received.

S513. If the user equipment detects or receives no first system information, the user equipment changes an initial format of the uplink trigger signal, or increases transmit power.

S514. The user equipment sends the uplink trigger signal again based on the changed initial format or the increased transmit power, to ensure that the base station can receive the uplink trigger signal and send the system information.

Further, in step S509, the base station is further configured to receive a second uplink trigger signal in the radio frame, determine, based on the second uplink trigger signal, a second time-frequency resource location for sending a broadcast channel, and send the system information on the second time-frequency resource location. In a specified time interval, the second time-frequency resource location has a second time offset relative to the frame header location of the radio frame, and the second time offset is not equal to the first time offset.

In the system provided in this embodiment, the base station periodically sends only the synchronization signal in an idle mode, and does not deliver the system information before the uplink trigger signal is detected by the base station. In this case, because the synchronization signal occupies a relatively small quantity of adaptive resources, all remaining time-frequency resources of the subframe can be dynamically configured, to flexibly adapt to an uplink service and a downlink service in the cell. This avoids the following problem because the base station simultaneously sends the synchronization signal and the broadcast channel that carries the system information, an entire time-frequency resource is occupied and further resource configuration flexibility in an LTE system is affected.

Figure 6:
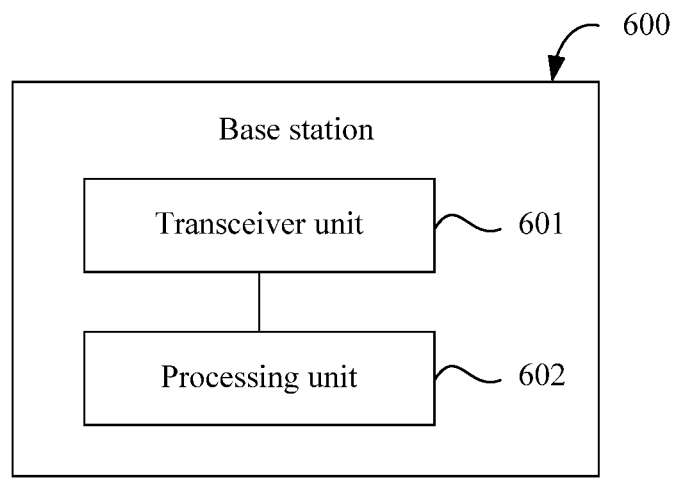
FIG. 6 is a structural block diagram of a base station according to an embodiment of this application.

In addition, corresponding to the foregoing embodiment of the system, this application further provides a base station 600. As shown in FIG. 6, the base station includes a transceiver unit 601 and a processing unit 602. The transceiver unit 601 is configured to receive at least one first uplink trigger signal in a first time-frequency resource group in a first radio frame. The processing unit 602 is configured to determine, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located. The transceiver unit 601 is further configured to send the first system information on the time-frequency resource of the first system information.

Further, the transceiver unit 601 is further configured to receive at least one second uplink trigger signal in a second time-frequency resource group in a second radio frame. The processing unit 602 is configured to determine, based on a time-frequency resource of the at least one second uplink trigger signal, a time-frequency resource used for sending second system information, where a start location of the time-frequency resource of the second system information in time domain has a second time offset relative to a frame header location of a radio frame in which the second system information is located, and the first time offset is different from the second time offset. The transceiver unit 601 is further configured to send the second system information on the time-frequency resource of the second system information.

Further, the transceiver unit 601 is further configured to send first indication information used to receive an uplink trigger signal, where the first indication information is located in the first time-frequency resource group of the radio frame.

The processing unit 602 is further configured to determine, based on the time-frequency resource of the at least one first uplink trigger signal, subcarriers that occupy a same frequency region, and determine the time-frequency resource of the first system information based on the subcarriers that occupy the same frequency region.

Figure 7:
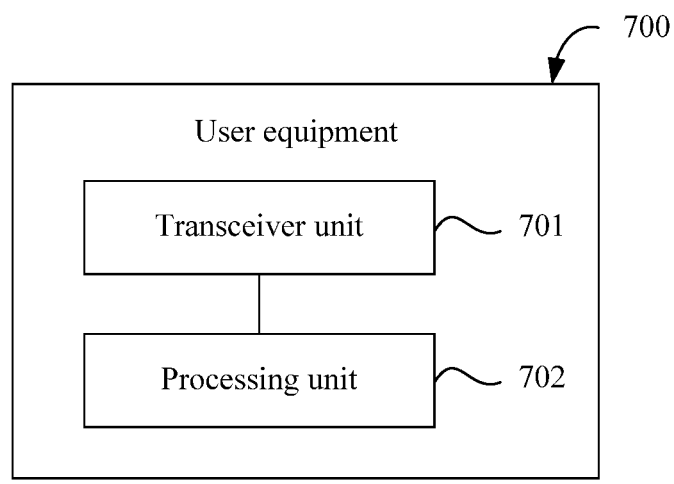
FIG. 7 is a schematic block diagram of user equipment according to an embodiment of this application.

In addition, an embodiment further provides user equipment 700. As shown in FIG. 7, the user equipment 700 includes a transceiver unit 701 and a processing unit 702.

The transceiver unit 701 is configured to receive a synchronization signal of a serving cell or second indication information, where the second indication information is used to indicate trigger signal sequence information. The processing unit 702 is configured to determine a trigger signal resource of the serving cell based on the synchronization signal and/or the second indication information, where the trigger signal resource of the serving cell includes a time-frequency resource of at least one uplink trigger signal and/or sequence information of the at least one uplink trigger signal, and generate an uplink trigger signal based on the trigger signal resource of the serving cell. The transceiver unit 701 is further configured to send the uplink trigger signal on a time-frequency resource of the uplink trigger signal. The processing unit 702 is further configured to determine a second time-frequency resource group in a radio frame based on the time-frequency resource of the uplink trigger signal. The transceiver unit 701 is further configured to receive system information in the second time-frequency resource group.

Further, the processing unit 702 is further configured to determine, based on the synchronization signal, identification information of the serving cell or identification information corresponding to the serving cell, where the identification information corresponding to the serving cell is identification information that has a same function as the identification information of the serving cell and that can be used to identify the serving cell, and determine the trigger signal resource of the serving cell based on the identification information of the serving cell or the identification information corresponding to the serving cell.

Further, the processing unit 702 is further configured to determine the trigger signal sequence information based on the trigger signal resource of the serving cell, and generate the uplink trigger signal based on the trigger signal sequence information. If the second indication information is received, the processing unit 702 obtains the trigger signal sequence information based on the second indication information, and generates the uplink trigger signal based on the trigger signal sequence information.

The processing unit 702 is further configured to before the uplink trigger signal is sent, detect whether first indication information is received, and if the first indication information is received, determine, based on the first indication information, the time-frequency resource used for sending the uplink trigger signal, and send the uplink trigger signal on the time-frequency resource of the uplink trigger signal.

In addition, the processing unit 702 is further configured to when the system information is not received in the second time-frequency resource group, change a format of the uplink trigger signal and/or increase transmit power, and send the uplink trigger signal again based on the changed format and/or the increased transmit power.

The second time-frequency resource group includes at least one system information resource of the serving cell, and the system information resource includes a time-domain resource, a frequency-domain resource, and a codeword resource. Optionally, the frequency-domain resource of the system information and a frequency-domain resource of the uplink trigger signal occupy a same frequency-domain subcarrier, the time-domain resource of the system information is a time-domain resource within a specified time interval after the user equipment sends the uplink trigger signal, and the codeword resource of the system information includes a scrambling code of the system information.

In this embodiment, the base station delivers the first system information to a user equipment based on the determined time-frequency resource only after receiving the uplink trigger signal sent by the user equipment. Because the time-frequency resource used for delivering the first system information has a time offset relative to the frame header location of the radio frame, it can be ensured that the base station does not simultaneously send the synchronization signal and a broadcast channel that carries the first system information, so that the base station does not send the first system information without detecting the uplink trigger signal. In this case, because a time-frequency resource used for receiving a downlink bearer is used to receive only a periodically sent synchronization signal, and the synchronization signal occupies a relatively small quantity of resources, most of remaining time-frequency resources can be dynamically configured, for example, used for uplink data transmission, so that occupation of time-frequency resources of an entire subframe is avoided, thereby improving resource configuration flexibility in an LTE system.

Figure 8:
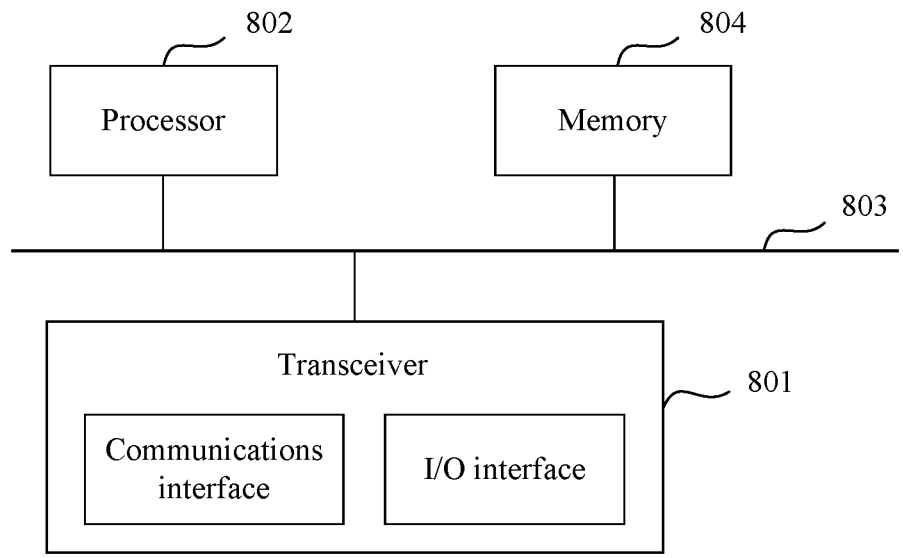
FIG. 8 is a schematic structural diagram of another base station according to an embodiment of this application.
Figure 9:
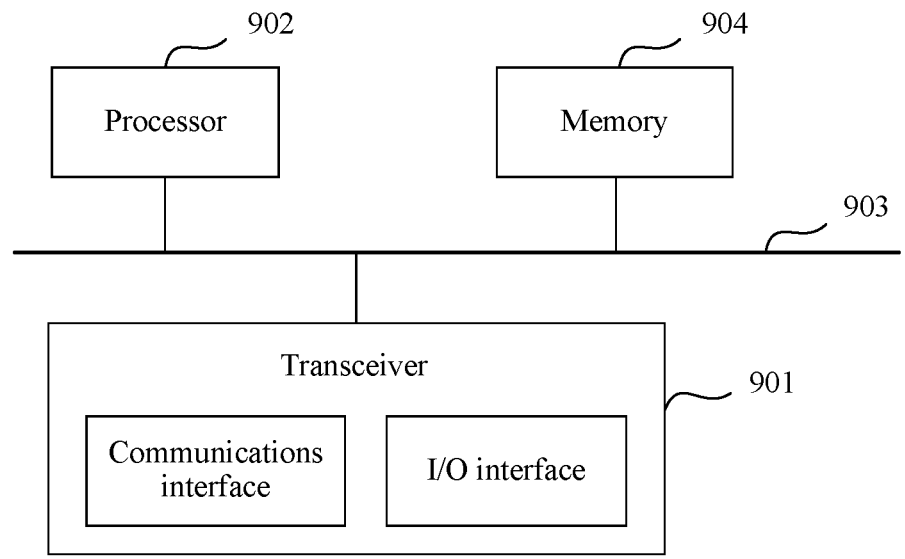
FIG. 9 is a schematic structural diagram of another user equipment according to an embodiment of this application.

Corresponding to the foregoing embodiments of the base station 600 and the user equipment 700, in specific hardware, this application further provides a base station and user equipment. As shown in FIG. 8 and FIG. 9, the base station includes a transceiver 801, a processor 802, a communications bus 803, and a memory 804, and the transceiver 801 includes at least one communications interface and/or an I/O interface. Correspondingly, the user equipment includes a transceiver 901, a processor 902, a communications bus 903, and a memory 904, and the transceiver 901 includes at least one communications interface and/or an I/O interface.

The transceiver 801 in the base station is a hardware device configured to implement all functions of the receiving unit 601 in the foregoing embodiment, and the processor 802 is a hardware device that implements all functions of the processing unit 602 in the foregoing embodiment. Correspondingly, the transceiver 901 in the user equipment is a hardware device configured to implement all functions of the receiving unit 701 in the foregoing embodiment, and the processor 902 is a hardware device that implements all functions of the processing unit 702 in the foregoing embodiment.

In a specific embodiment, a system information sending system that includes a base station and at least one user equipment is further provided. Both the base station and the user equipment are applied to the hardware devices or the apparatus units in the foregoing embodiments. In this system, the base station delivers system information to the user equipment, and a specific delivering process includes the following steps.

The user equipment receives a synchronization signal of a serving cell or second indication information, where the second indication information is used to indicate trigger signal sequence information, determines a trigger signal resource of the serving cell based on the synchronization signal or the second indication information, where the trigger signal resource of the serving cell includes a group of uplink trigger signal time-frequency resources and/or a group of uplink trigger signal codewords.

The user equipment further generates an uplink trigger signal based on the trigger signal resource of the serving cell, and sends the uplink trigger signal on a time-frequency resource of the uplink trigger signal.

The base station receives at least one first uplink trigger signal in a first time-frequency resource group in a first radio frame, determines, based on a time-frequency resource of the at least one first uplink trigger signal, a time-frequency resource used for sending first system information, where a start location of the time-frequency resource of the first system information in time domain has a first time offset relative to a frame header location of a radio frame in which the first system information is located, and sends the first system information on the time-frequency resource of the first system information.

The user equipment determines, based on the time-frequency resource of the uplink trigger signal, a second time-frequency resource group used for sending the system information, and receives the first system information in the second time-frequency resource group of the system information.

In the foregoing provided embodiments, in specific hardware structures of the base station and the user equipment, the processor may be a general-purpose central processing unit (CPU), a microprocessor, an application-specific integrated circuit (ASIC), or one or more integrated circuits for controlling program execution of the solutions of the present invention.

The communications bus may include a channel, to transmit information between the foregoing components or devices, that is, used for communication between the user equipment and the base station. The communications interface is any type of apparatus such as a transceiver, and is configured to communicate with another device or a communications network, for example, an Ethernet, a radio access network (RAN), or a wireless local area network (WLAN).

The memory may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another disk storage device, or any other medium that can be used to carry or store expected program code in an instruction or data structure form and that can be accessed by a computer, but is not limited thereto. The memory may exist independently and is connected to the processor by using the bus. Alternatively, the memory may be integrated with the processor. The memory is configured to store application program code used to execute the solutions of the present invention, and the application program code is executed under control of the processor. The processor is configured to execute the application program code stored in the memory.

An embodiment of this application further provides a computer storage medium, configured to store a computer software instruction used in the system information sending method provided in the foregoing embodiment and the system information receiving method, and the computer software instruction includes a program designed to perform the foregoing method embodiments. System information can be sent and received by executing the stored program.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, and an optical memory) that include computer-usable program code. The computer program is stored/distributed in a proper medium and is provided as or used as a part of the hardware together with another hardware, or may be distributed in another manner, for example, by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

Although the present invention is described with reference to specific features and the embodiments thereof, apparently, various modifications and combinations may be made to them without departing from the spirit and scope of the present invention. Correspondingly, the specification and accompanying drawings are merely example description of the present invention defined by the accompanying claims, and are considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A system information receiving method, comprising:
   receiving, by a terminal device, first indication information from a network device, wherein the first indication information indicates trigger signal sequence information and a trigger signal time-frequency resource;
   receiving, by the terminal device, second indication information from the network device, wherein the second indication information indicates a subframe type;
   determining, by the terminal device, sequence information of an uplink trigger signal and a time-frequency resource of the uplink trigger signal according to the first indication information and the second indication information;
   generating, by the terminal device, the uplink trigger signal according to the sequence information of the uplink trigger signal;
   sending, by the terminal device, the uplink trigger signal on the time-frequency resource of the uplink trigger signal;
   determining, by the terminal device, based on the time-frequency resource of the uplink trigger signal, a time-frequency resource group of system information; and
   receiving, by the terminal device, the system information in the time-frequency resource group of the system information.

2. The method according to claim 1, wherein receiving the system information in the time-frequency resource group comprises:
   detecting, by the terminal device, the system information in the time-frequency resource group; and
   receiving the system information in the time-frequency resource group in response to the system information being detected; and
   wherein the method further comprises:
   resending the uplink trigger signal, in response to the system information not being detected.

3. The method according to claim 1,
   wherein a time-domain resource of the time-frequency resource group of the system information is a time interval corresponding to the time-frequency resource of the uplink trigger signal.

4. A system information receiving apparatus, comprising:
   a processor; and
   a non-transitory computer-readable storage medium storing a program to be executed by the processor, the program including instructions to:
   receive first indication information from a network device, wherein the first indication information indicates trigger signal sequence information and a trigger signal time-frequency resource;
   receive second indication information from the network device, wherein the second indication information indicates a subframe type;
   determine sequence information of an uplink trigger signal and a time-frequency resource of the uplink trigger signal according to the first indication information and the second indication information;
   generate the uplink trigger signal according to the sequence information of the uplink trigger signal;
   send the uplink trigger signal on the time-frequency resource of the uplink trigger signal;
   determine, based on the time-frequency resource of the uplink trigger signal, a time-frequency resource group of system information; and
   receive the system information in the time-frequency resource group of the system information.

5. The apparatus according to claim 4, wherein the instructions to receive the system information in the time-frequency resource group include instructions to:
   detect the system information in the time-frequency resource group; and
   receive the system information in the time-frequency resource group in response to the system information being detected; and
   wherein the program further includes instructions to:
   resend the uplink trigger signal in response to the system information not being detected.

6. The apparatus according to claim 4, wherein a time-domain resource of the time-frequency resource group of the system information is a time interval corresponding to the time-frequency resource of the uplink trigger signal.

7. The method according to claim 1, wherein resending the uplink trigger signal comprises:
performing at least one of changing a format of the uplink trigger signal or increasing transmit power; and
resending the uplink trigger signal based on at least one the changed format or the increased transmit power.

8. The apparatus according to claim 4, wherein instructions to resend the uplink trigger signal include instructions to:
perform at least one of changing a format of the uplink trigger signal or increasing transmit power; and
resend the uplink trigger signal based on at least one the changed format or the increased transmit power.

9. A system information sending method, comprising:
sending, by a network device, first indication information to a terminal device, wherein the first indication information indicates trigger signal sequence information and a trigger signal time-frequency resource;
sending, by the network device, second indication information to the terminal device, wherein the second indication information indicates a subframe type;
receiving, by the network device, an uplink trigger signal on a time-frequency resource of the uplink trigger signal;
determining, by the network device, based on the time-frequency resource of the uplink trigger signal and the subframe type, a time-frequency resource group of system information; and
sending, by the network device, the system information in the time-frequency resource group of the system information.

10. The method according to claim 9,
wherein a time-domain resource of the time-frequency resource group of the system information is a time interval corresponding to the time-frequency resource of the uplink trigger signal.

11. A system information receiving apparatus, comprising:
a processor; and
a non-transitory computer-readable storage medium storing a program to be executed by the processor, the program including instructions to:
send first indication information to a terminal device, wherein the first indication information indicates trigger signal sequence information and trigger signal time-frequency resource;
send second indication information to the terminal device, wherein the second indication information indicates a subframe type;
receive an uplink trigger signal on a time-frequency resource of the uplink trigger signal;
determine, based on the time-frequency resource of the uplink trigger signal and the subframe type, a time-frequency resource group of system information; and
send the system information in the time-frequency resource group of the system information.

12. The apparatus according to claim 11, wherein a time-domain resource of the time-frequency resource group of the system information is a time interval corresponding to the time-frequency resource of the uplink trigger signal.

\* \* \* \* \*